May 8, 1951  J. C. DIONNE  2,552,089
SENSITOMETER
Filed March 2, 1948  4 Sheets-Sheet 1

INVENTOR.
John C. Dionne
BY
Mann and Brown
Attys.

Fig-5

May 8, 1951     J. C. DIONNE     2,552,089
SENSITOMETER

Filed March 2, 1948     4 Sheets-Sheet 3

INVENTOR.

John C. Dionne.

May 8, 1951 J. C. DIONNE 2,552,089
SENSITOMETER

Filed March 2, 1948 4 Sheets-Sheet 4

INVENTOR.
John C. Dionne

Patented May 8, 1951

2,552,089

UNITED STATES PATENT OFFICE 2,552,089

SENSITOMETER

John C. Dionne, Chicago, Ill.

Application March 2, 1948, Serial No. 12,569

12 Claims. (Cl. 175—183)

My invention relates to means for testing, checking and adjusting electrical devices and is particularly directed to improvements in a sensitometer for use with a system for the magnetic detection of structural flaws in rails and the like. It will be apparent that the invention may be embodied in sensitometers for testing other systems, including electrical systems for flaw detection.

A typical traveling test apparatus for detecting flaws in track includes the combination of a detector unit incorporating one or more coils for movement along a magnetized rail, an amplifier responsive to the detector unit and some means responsive to the amplifier for indicating the magnitude and character of the detected flaws. Since railroad safety depends upon the reliability of such a flaw-detecting system, it is highly important to have available some means for frequently checking the performance, efficiency and sensitivity of the detecting system. If the system checks satisfactorily both at the beginning and the end of a test period, the record of flaws detected in the test period may be relied upon.

Deficiencies in the operation of the flaw-detecting system may arise in the detector unit and the leads from the detector unit to the amplifier or may be found in the amplifier itself. It is desirable to be able to make a check on the amplifier itself as well as an over-all check on the system for quickly determining the general location of any defectiveness that might occur in the system. A comparison between the findings of an over-all check and an amplifier check will immediately reveal any necessity for replacing the detector unit or any necessity for a more detailed check of the amplifier.

In the operation of a flaw-detecting system, occasion may arise to vary the threshold of responsiveness of the system with respect to magnetic indications of structural flaws. One reason for varying the sensitivity or threshold level of the system may be a change in the character of the material under inspection. For example, the change in character may involve an increase or a decrease in the energy level of flaw indications making appropriate a corresponding change in the sensitivity of the system. As a further example, the change in character of the material under inspection may introduce an excessive number of false indications of low energy that may be largely eliminated by an upward shift in the response threshold of the system.

The general object of my invention is to provide a sensitometer of relatively simple construction to meet the various requirements indicated above with convenience and efficiency. One of my more specific objects is to provide a system that may be quickly applied either to the detector unit for an over-all check of the system or alternatively may be directly applied to the amplifier.

When a test car traverses a section of track, the character of the flaw-indicating impulses of current produced in the system is determined not only by the magnetic fields of the track but also both by the design of the detector unit and by the rate of travel along the track. Since a test car has a detector unit of a given type and travels during a test at a given rate, the flaw-detecting impulses normally produced in a particular detector system will be in general of a given character. One of the objects of my invention is to provide in the sensitometer a combination of resistance, inductance and capacitance such as to produce in a detector system impulses of current of the same general character as the typical impulses arising from structural flaws.

In assembling a detector system or in replacing a detector unit in a system it may be essential that the detector unit be incorporated at a given polarity, for example the polarity to create indicating waves of proper sign in the amplifier. One object of my invention is to provide a sensitometer that will quickly reveal whether or not a newly installed detector unit is positioned at correct polarity.

Certain objects of my invention relate to the use of meter means in the sensitometer to indicate current values in the sensitometer circuits when the sensitometer is employed to produce test indications in the detector system. Some of these objects are: to calibrate the sensitometer circuits for use with a meter common to the circuits; to accomplish such calibration without any substantial variation from the desired character of test impulses produced by the different circuits; to provide a sensitometer in which comparative meter readings may be noted as standard for guidance in testing the detector system successively through the detector unit and through the amplifier; and to provide such a sensitometer in which the standard meter values for such two successive tests will be of similar or at least comparable magnitudes for producing an indication of any given magnitude in the detector system.

The above and other objects of my invention will be found in the following detailed description and the accompanying drawings.

In the drawings, which are to be considered as merely illustrative.

Figures 1, 3, 4:
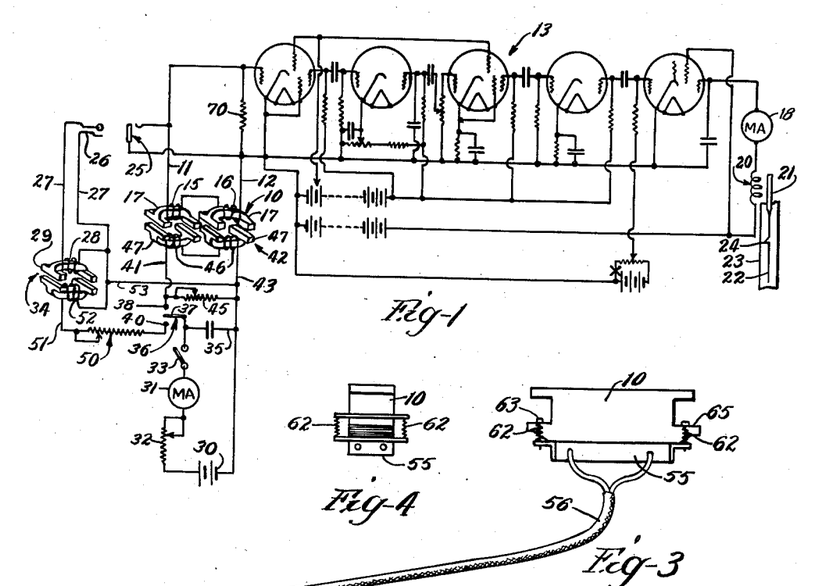
Fig. 1 is a wiring diagram of one form of sensitometer together with a wiring diagram of a portion of a flaw-detecting system.
Fig. 3 is a side elevation more or less diagrammatic showing an element of the sensitometer associated with the detector unit of a flaw-indicating system, the element being adapted for connection with the cabinet in Fig. 2.
Fig. 4 is an end view of Fig. 3.

By way of example, the sensitometer will be described as designed for use with a flaw-detector system of the character set forth in the copending application by Barnes and Keevil, Serial No. 706,596, filed October 30, 1946. As indicated in Fig. 1, such a flaw-detecting system includes a pickup or detector unit generally designated 10 connected by wires 11 and 12 to the input side of a five-tube amplifier generally designated 13. The particular detector unit 10 shown in the drawing comprises a pair of closely spaced coaxial detector coils 15 and 16 with U-shaped laminated cores 17. The two coils 15 and 16 are oppositely wound and are connected in series-opposition.

The output of the amplifier 13 controls some type of indicating means such as a meter or an automatic recorder. Fig. 1 shows both a milliammeter 18 and a pen relay 20, the pen relay controlling a pen 21 for tracing a line 22 on a moving record tape 23. A typical momentary flow of current through the detector unit 10 derived from a rail flaw will cause an indication or peak 24 to be drawn on the tape.

To introduce a test impulse of current directly into the amplifier 13 I may provide the detector system with a jack 25 to receive a complementary test plug 26 from the sensitometer in such manner that insertion of the test plug places the leads 27 of the test plug in communication with the input terminals of the amplifier and in parallel with the detector unit 10. The two leads 27 are shown connected to a secondary coil 28 of a test transformer generally designated 34 to the end that any impulse of current induced in the secondary coil will be communicated to the amplifier 13. Preferably the secondary coil 28 is of similar construction to the two coils 15 and 16, being wound on a U-shaped laminated core 29.

The preferred form of my sensitometer represented by Fig. 1 incorporates two separate test circuits, one being adapted to induce a test impulse of current in the detector unit 10 and the other being adapted to induce a similar test impulse of current in the test transformer 34. The required test circuits may be completely independent of each other with individual meters but, for simplicity, I prefer to design the two circuits to have in common a battery 30 and a milliammeter 31.

It is contemplated that current flow through the two test circuits will be adjustable so that the sensitometer may have different settings to correspond to different levels of sensitivity on the part of the detector system. For this purpose I may provide a single current-adjustment means common to the two test circuits such as a rheostat 32 inserted between the battery 30 and the milliammeter 31. I also prefer to use a single test switch 33 for opening and closing of the two test circuits.

As heretofore mentioned, each of the two test circuits has a combination of resistance, inductance and capacitance designed to create a test impulse in the flaw-detector system of the same general character as an operative impulse derived from normal movement of the test unit 10 across the external magnetic field of a structural flaw. Some elements of such combinations may be common to both of the two test circuits. The resistance of the rheostat 32 is such an element common to the two circuits. All of the capacitance involved may be provided by a condenser 35 in common to both circuits, the condenser 35 shunting both the battery 30 and the rheostat 32.

The described instrumentalities common to the two test circuits may be alternatively connected with the two circuits by a selector switch generally designated 36. The selector switch 36 includes a switch member 37 that is movable from a central neutral position in one direction against a fixed contact 38 and in the other direction against a fixed contact 40.

The first test circuit includes a fixed contact 38, a wire 41 from the contact to an inductance generally indicated 42 for inducing an impulse of current in the detector unit 10, and a wire 43 from the inductance to the condenser 35 and the battery 30. A variable resistance 45 shunts the inductance 42.

The inductance 42 may take any form suitable for its purpose and may be oriented with respect to the detector unit 10 either for creation of the desired test impulse by the rise of current flow on closing of the sensitometer circuit or for creation of the test impulse by current decay on opening of the sensitometer circuit. In my preferred form of the invention, the inductance 42 comprises a pair of closely coupled oppositely wound coils 46 connected in series-opposition and oriented for the appropriate induction by current rise rather than current decay in the sensitometer circuit.

The inductance 42 may be similar or even identical in construction with the detector unit 10. Thus Fig. 1 shows the two coils 46 of the inductance as having U-shaped cores 47 in end-to-end contact with their poles turned towards the poles of the detector unit 10.

The second test circuit in the sensitometer may be traced as follows: fixed contact 40 of the selector switch 36, variable resistance 50, wire 51, the primary coil 52 of the test transformer 34, and a wire 53 connected to the previously mentioned wire 43 leading to the condenser 35 and battery 30. The primary coil 52 may be of the same construction as the secondary coil 28, the poles of the two coils being directed towards each other, preferably with an air gap of the order of $\frac{1}{32}$ or $\frac{1}{16}$ inch. The precise spacing is such as to result in a given indication in the flaw detector system, for example a minimum indication, and is determined empirically.

The resistances 45 and 50 serve as calibration resistances. The high-ohmic resistance 45 shunts the relatively large number of turns of the two coils 46 to avoid an excessive ampere-turn value while the low-ohmic resistance 50 is in series with the fewer turns of the primary coil 52. When the rheostat 32 is adjusted to completely cut out its resistance, the total resistance of the two test circuits are close to equal and substantially one milliampere of current will flow at either of the two limit positions of the selector switch 36.

Only rough calibration is necessary to keep the possible current values of the two test circuits within the operative range of the milliammeter 31, but for convenience the two values should not be too far apart. In other words, current flow through one of the test circuits necessary to produce a given indication on the record tape 23 should be comparable in magnitude to the current flow necessary in the other test circuit to produce the same indication on the record tape.

While the sensitometer may be employed with only approximate calibration between the two circuits, the fact that the resistances 45 and 50 are adjustable makes it possible to attain precision calibration and in some practices of the invention the resulting simplification of operation will be sought.

When either of the two circuits is closed by the test switch 33, current flow therein rises to maximum over a time period determined by the resistance, inductance and capacitance of the circuit, and such rise of primary current induces an impulse or wave of current for transmission to the amplifier.

A feature of my invention is the close approximation of a sensitometer-generated impulse to an impulse derived from an actual structural flaw, such close approximation being achieved by the proper selection of test coils and circuit factors.

In the preferred practice of my invention, the two coils 28 and 52 of the test transformer are identical in construction with the individual coils 15 and 16 of the detector unit 10.

The core of such a coil comprises 12 laminations of high silicon steel each approximately .014 inch thick. The assembled core is one inch in over-all length, ½ inch high, and the spacing between the two legs of the core is ⅝ inch. The central portion of the core which carries the winding is ½ inch wide and the thickness of 12 laminations. The winding comprises 8500 turns of Number 42 enameled wire having a total resistance of approximately 2000 ohms. The two coils 28 and 52 of the test transformer 34 are of similar construction but have cores of 10 laminations each approximately .018 inch thick and are wound with 5000 turns of the Number 42 wire.

Employing a three-volt battery 30 and five mfd. condenser 35, we have the following approximate impedance values in the sensitometer circuits in addition to the inductances of the coils involved: resistance of the rheostat 32, 100,000 ohms; resistance 45, 10,000 ohms; the two coils 46, 2,000 ohms each; resistance 50, 1,000 ohms; and coil 52, 2,000 ohms.

The various circuit factors specified including the specific coils result in close similarity between the character of a test impulse and the character of a typical flaw-indicating impulse. In practice the values are originally determined empirically by employing an oscilloscope to obtain an oscillogram of a typical flaw indication and then varying the circuit factors to find a combination to produce substantially the same oscillogram. The condenser 35 serves to prolong the period of current rise or current decay and therefore serves as means to vary the width of the test wave as may be required.

Figure 2:
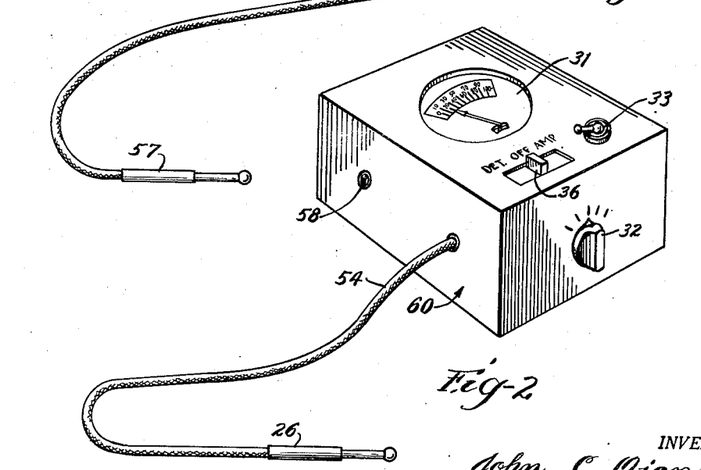
Fig. 2 is a perspective view of a sensitometer housing or cabinet.
Figure 5:
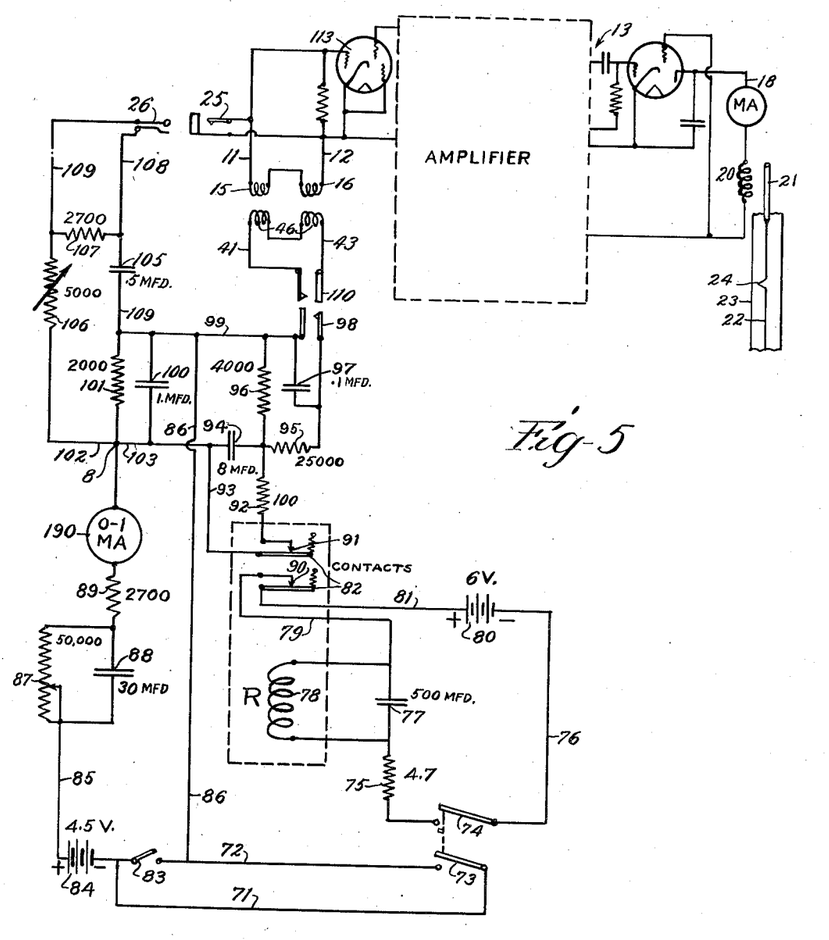
Fig. 5 is a diagram showing the amplifier, etc., of Fig. 1 associated with an improved and preferred form of sensitometer, intermediate portions of the amplifier being omitted to provide for the use of large scale drawing.

In practice, my invention may be embodied in the sensitometer construction shown in Figs. 2, 3 and 4, as will now be described.

The inductance 42 is enclosed in a small casing 55 from which a cable 56 leads to a plug 57 for insertion in a complementary jack 58 in the side of a sensitometer housing 60. Fig. 3 shows a detector unit or shoe 10 of a flaw-detector system, this shoe enclosing the previously mentioned detector coils 15 and 16 of the system. For a test through the detector unit 10 the unit is first lifted from its normal rail-contacting position so that the casing 55 may be placed against the under face of the unit as indicated in Fig. 3.

Any suitable means may be employed to hold the casing 55 in the test position. For example, each end of the casing may be provided with a pair of coil springs 62 connected to the opposite ends of a small cross rod 63 to engage an end shoulder 65 of the unit.

The sensitometer housing 60 encloses the remainder of the sensitometer circuits and is provided with a suitable cable 54 leading to the previously mentioned plug 26 for insertion in the amplifier jack 25. Fig. 2 shows by way of example rheostat 32 on one end of the housing 60 and shows on the upper face of the housing the previously mentioned milliammeter 31, the test switch 33, and the selector switch 36.

To use the described sensitometer with a flaw-detecting system, preliminary calibrating and indexing of the sensitometer is desirable. Preliminary data may be obtained, for example, by moving the detector unit 10 of the system across a typical magnetized structural flaw in a normal manner to produce an indication 24 on the record tape to serve as a reference or standard. Preferably the amplifier is so adjusted that the standard or reference indication on the record tape is of such low magnitude as to be barely perceptible. The operator may then apply the casing 55 to the detector shoe and guided by the reference indication on the record tape may arrive by trial and error at the particular adjustment of the rheostat 32 necessary to produce a test indication of the same barely perceptible magnitude. The particular reading of the sensitometer milliammeter at this adjustment of the rheostat is the sensitometer setting required to produce a test impulse corresponding in magnitude to the magnetic field of the selected structural flaw. By the same trial and error procedure the necessary adjustment of the rheostat is ascertained for creating a test indication of the same magnitude with the plug 26 inserted in the amplifier jack 25. A second reading of the sensitometer milliammeter is then taken. The accuracy of the two readings with respect to the selected structural flaw is not affected by the sensitivity setting of the detector system.

Another procedure for preliminary calibration and indexing of the sensitometer that has been followed with satisfaction involves the use of an oscilloscope. In this procedure the detector unit 10 is moved across a typical magnetized structural flaw in a normal manner, the output being fed into an oscilloscope. The resulting wave is measured as to frequency, shape and magnitude. The sensitometer is then plugged into the same oscilloscope and the plugged-in circuit of the sensitometer is adjusted to give a wave of substantially the same type and strength. The casing 55 if then applied to the detector shoe and the operator, by trial and error, arrives at the adjustment of the rheostat 32 necessary to cause the second circuit of the sensitometer to produce a wave of a given type and strength on the oscilloscope.

The pair of readings of the milliammeter 31 thus arrived at, representing a given setting of the sensitometer, are noted or indexed for subsequent use. If desired, a series of such pairs of reference or standard meter readings may be derived to represent a series of flaw-created magnetic fields increasing progressively in magnitude or to represent a progressive series of sensitivity levels to which the amplifier may be adjusted.

In another practice of the invention the operator will have in mind setting the sensitivity or the threshold of response of the amplifier at a level just above the relatively low energy level of false or superficial indications but below the energy level of true flaw indications. For example, if a section of track is known to have an excessively large number of wheel burns, as is often the situation in or near a railroad yard, most of the wheel burn indications can be kept from appearing on the record tape by moderately raising the amplifier sensitivity level and the indications of wheel burns that do appear on the record tape will be of such small magnitude relative to true flaw indications that they will be distinguishable at a glance.

My sensitometer makes it a simple matter to check the sensitivity of the detector system against a known and unvarying standard or to shift the sensitivity of the detector system to predetermined levels at will.

In my preferred procedure for adjusting the sensitivity of the detector system I select the appropriate pair of readings of the milliammeter 31 for guidance in setting the sensitometer and then using either of the two test circuits I produce the selected test impulse in the detector system and adjust the responsiveness of the amplifier to a level at which the selected test impulse is barely perceptible on the record tape 23.

It is recommended that any flaw-detecting system in continual operation be tested at least twice a day for the detection and correction of any drift in the sensitivity of the system. Whenever a detector shoe is replaced in the system, a test impulse should be induced in the new shoe not only to check the sensitivity of the system but also to ascertain whether or not the detector coils in the shoe are correctly polarized.

The preferred form of sensitometer is shown in Figs. 5, 6, 7, 8, and 9 with the data as to resistances, capacities, etc., indicated on the corresponding parts of the diagrams; and, in the interests of brevity, a detailed description of those same things is omitted.

The timing or pulsating circuit

Figure 6:
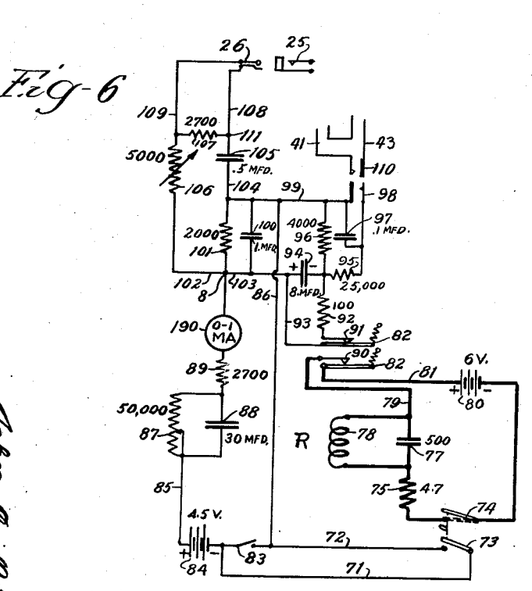
Fig. 6 is a diagram of the preferred form of sensitometer emphasizing the timing or pulsating circuit.

In Fig. 6, the timing or pulsating circuit is indicated in heavy lines. It is controlled by a switch blade 74. When closed, as indicated in dotted lines in that figure, current will flow from the positive side of the battery 80 through connection 81 to an armature 82 of an electric relay, thence to a contact 90, thence through a connection 79 to the solenoid 78 of the relay, thence through the resistance 75 back through the switch blade 74 to the negative side of the battery. A condenser 77 of 500 microfarads is connected across the solenoid 78.

The effect of that current flow is to simultaneously energize the solenoid and charge the condenser 77. When the energization reaches the critical value, the armature 82 is attracted to the core of the solenoid, and the circuit is opened at the contact 90. But for the condenser 77 the solenoid would immediately be de-energized and the armature 82 would recover, closing the circuit again after the fashion familiar to electric door bell annunciators or electric buzzers. However, the condenser 77 discharges through the solenoid 78 in the same direction as the current flowed before the circuit was interrupted at 90, and thus prolongs the open period of the circuit. The effect of this condenser discharge is to reduce the frequency of opening and closing the circuit at the contact 90. In this particular embodiment, that is regulated at approximately 180 cycles per minute.

The armature 82, shown as two pieces in the diagrams, is actually in one piece and cooperates with the contact 90, as just described, and also with the contact 91 in the auxiliary part of the signal generating circuit. The contacts 90 and 91 move in unison, but are electrically insulated to control the respective circuits.

The whole purpose of the timing or pulsating circuit energized by battery 80 as described is to make and break the signal generating circuit at the contact 91, and it is chosen because of the availability of electric current in connection with flaw-detection apparatus, but it is contemplated that, under some conditions, other forms of timing devices will be used.

The primary signal generating circuit

Figure 7:
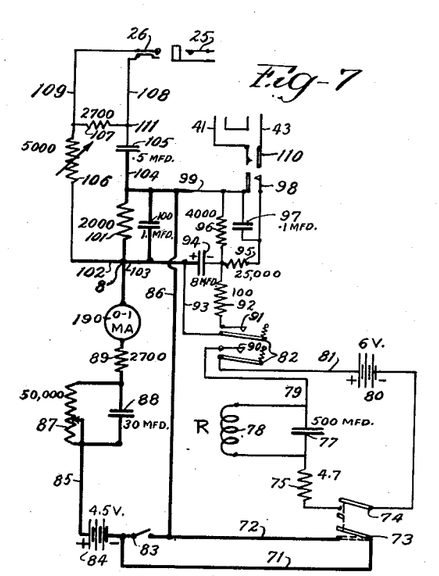
Fig. 7 is a similar view emphasizing the primary part of the signal generating circuit.

The signal generating circuit includes what may be called a primary and an auxiliary circuit, or the whole may be characterized as a divided circuit since parts of the primary and auxiliary circuits are common. Fig. 7 emphasizes in heavy lines what may be called the primary circuit. It is controlled by a switch arm 73 actually operated in unison with the switch arm 74 to the end that the two circuits will be closed or opened at the same time.

When the switch blade 73 is moved to the position indicated in dotted lines in Fig. 7, current flows from the battery 84 in the circuit indicated by heavy lines. Thus, it flows from the positive side of the battery 84 through the connection 85 through variable resistance 87, the fixed meter protecting resistance 89, the milliammeter 190, the resistance 101, the connection 99, to the return 86, the connection 72, to the switch blade 73, the connection 71, back to the negative side of the battery. A one microfarad condenser 100 is connected across the resistance 101, and is necessarily charged by the voltage impressed across that resistance.

The auxiliary signal generating circuit

The auxiliary signal generating circuit is the same as the primary from the positive side of the battery through the milliammeter to the connector 103. From there the current proceeds through the connector 93, the armature 82, to the contact 91, the 100 ohm resistor 92, the 4,000 ohm resistor 96, the connector 99, back to the return 86, and from there the circuit is the same as in the primary signal energizing circuit.

An 8 microfarad condenser 94 is charged by the pressure in the main signal generating circuit when the auxiliary signal circuit is open at contact 91. It is abruptly discharged when the auxiliary signal generating circuit is closed at the contact 91, as shown in Figs. 8 and 9.

Figure 8:
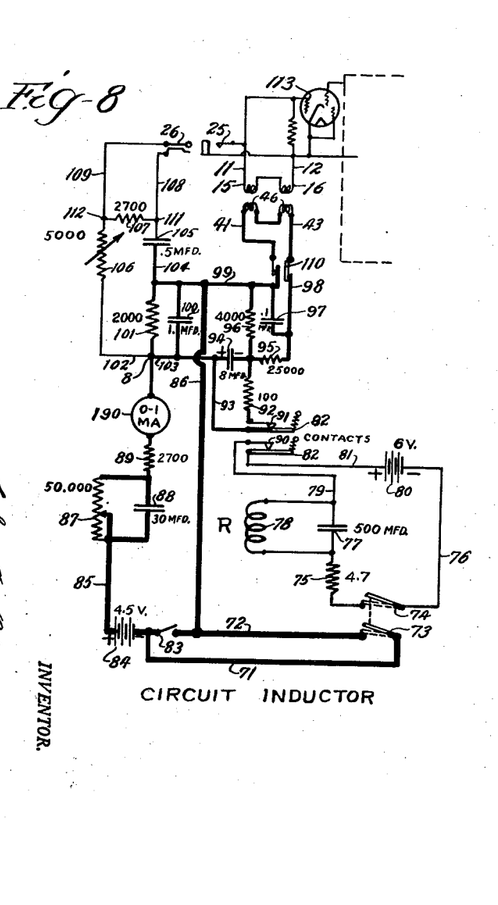
Fig. 8 is a similar view emphasizing the two parts of the signal generating circuit connected through an inductor with the pick-up of the flaw detecting apparatus as the same is used for testing the entire apparatus.
Figure 9:
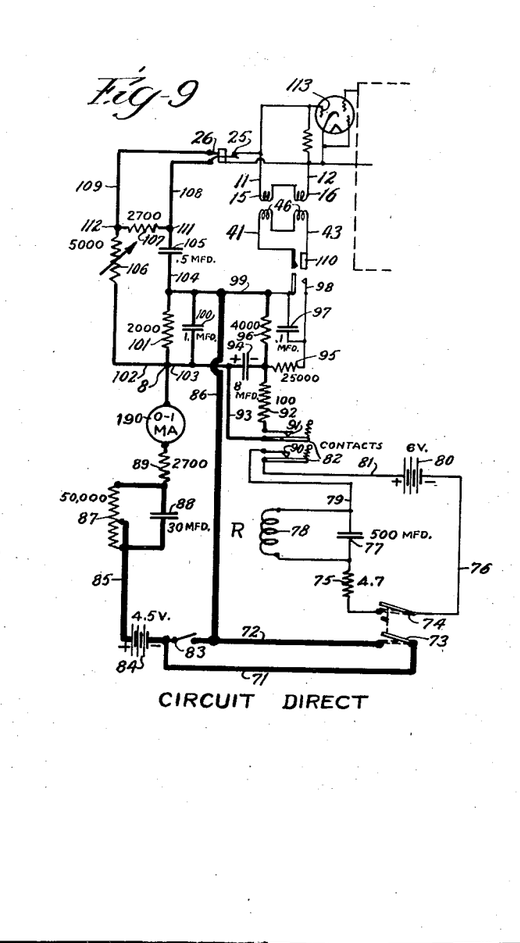
Fig. 9 is a similar view emphasizing the two parts of the signal generating circuit of the sensitometer and connected to the amplifier for testing it.
Figure 10:
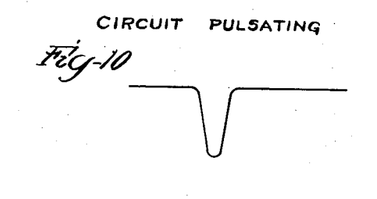
Fig. 10 is a diagram showing the form of voltage wave or impulse effected by closing the signal generating circuit.
Figure 11:
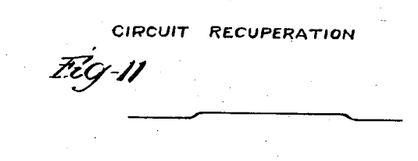
Fig. 11 is a diagram of the impulse at the breaking or opening of the signal generating circuit.

The condition of the signal generating circuit is shown in Fig. 7, when the auxiliary circuit is open at the contact 91, and in Fig. 8 when that circuit is closed at 91. There is a division of the current at the junction mark 8 when the contact 91 is closed, and only the main circuit is energized when the contact 91 is open. Hence, there are two levels of voltage impressed across the resistance 101 and condenser 100, a higher voltage when the contact 91 is open, and a lower voltage when the contact 91 is closed. The high level of voltage when the contact 91 is open serves to charge the condenser 94 through the resistance 96. When the contact 91 closes with the armature 82, the condenser 94 is discharged suddenly through the connector 93, the armature 82, the contact 91, and the resistor 92. At the same instant, the voltage across the resistance 101 and condenser 100 is reduced to the low level. Hence, when the contact 91 closes a relatively sudden impulse of current flows through the resistance 96.

It is not indispensable that the auxiliary circuit be opened at the contact 91. The necessary condition is a sudden change in the relative voltage levels in the primary and auxiliary circuit, which may be accomplished without actually opening either, as will be readily understood.

Coupling to the inductor coils

As shown in Fig. 8, the inductor coils 46 are connected by the wires 41 and 43 with a jack 110 into which there has been inserted a plug 98 attached to a coupling circuit including the condenser 97 and the resistance 95. The sudden pulse of current just mentioned is reduced by the resistance 95, and then impressed upon the inductor coils 46 through the coupling circuit. The condenser 97, being directly in parallel with the inductor coils, serves to retard the abruptness of the rise of current, so as to make it commensurate with the rise of current impulse induced by cutting the magnetic field in the neighborhood of a magnetized flaw.

The condenser 97 charges slowly through the high resistance 95.

The condenser 97 and the inductor coils 46 form a simple tuned circuit. The decay of the impulse from the sensitometer takes the form of the well known oscillatory discharge, but only the first main wave is of sufficient amplitude and correct polarity to be significant. This test through the inductor coils 46 is made but infrequently, such as on occasions where a new pickup has been installed, and it is desired to check the polarity. In the main, the tests are made through the amplifier alone.

Coupling direct to the amplifier

Fig. 9 shows the sensitometer connected direct to the amplifier by inserting the plug 26 in the jack 25. The coupling circuit includes connectors 102 and 104 from the ends of the resistance condenser combination 101, 100, connectors 109 and 108 leading to plug 26, an output resistance 107 connected across the wires 109 and 108 at 112 and 111, and a condenser 105 between 111 and the resistance 101. (A variable resistance 106 is shown between the junctions 8 and 112, but for present purposes it may be ignored, for it is used to standardize a group of sensitometers.) The output resistance 107 is roughly equal to the resistance of the pickup coils 46.

When the auxiliary circuit is open at the contact 91, a condition that has been referred to as "recuperation," a very small wrong polarity current flows through the resistances 106 and 107 to charge the condenser 105 to the same voltage that slowly builds up across the resistance capacity combination 101, 100 during recuperation. As the end of that period is reached, no current flows through resistance 107, and the condenser 105 has received its full charge. Both ends of the resistance 107 are at substantially zero potential because no current flows, and one end is connected to ground through the plug 26 leading to the amplifier.

When the contact 91 closes the auxiliary signal generating circuit, some of the current formerly passing through resistance 101 will go through the parallel path afforded by connectors 103, 93, contact 91, resistances 92 and 96, back to the return 86. This division of current and drop in potential across the resistor 101 from the upper level to the lower level will occur quite suddenly when the contact 91 closes, because the heavy condenser 94 will then be discharged rapidly through resistance 92. Due to the drop of voltage across the resistance capacity combination 101, 100, the positive end becomes less positive, or less strongly positive. This causes an impulse of current to flow back from the charged condenser 105 through the resistances 107 and 106 and a momentary voltage wave across the resistance 107, the negative polarity of the momentary voltage wave being at the condenser 105 end. It is connected to the grid of the amplifier. The positive polarity of this momentary voltage surge appears at the other end of the resistor 107, designated 112, and passes along the wire 109 to ground through the plug 26 and the jack 25.

With the values of the components used, the negative wave or generated signal has a duration very nearly equal to the negative part of that generated by the standard pickup when passing over a small flaw.

Since the entire signal generating portion of the sensitometer is a floating circuit—that is, not internally connected to ground—the polarity of the output signal can be reversed by simply reversing the connections of the leads 109 and 108 at the plug 26.

When the plug 26 is inserted in the jack 25, as shown in Fig. 9, the detector car is not in operative condition, because the sensitometer circuit is connected in parallel to the pickup and acts to reduce or partially absorb any signal generated by the pickup. The sensitometer, however, is in operative condition, and signals generated by it and controlling more or less amplitude can be made strong enough to overcome the loading caused by the pickup in parallel and supply a selected strength of negative polarity signals to which the amplifier can be made just barely responsive by means of the sensitivity control. Then the amplifier sensitivity will be at the relative threshold of response selected as indicated by reading the sensitometer meter 190. This means that, when the plug 26 is removed from the jack 25 and the amplifier sensitivity control remains as set, all signals below a certain strength will not actuate the recording pen 21 (Fig. 1), but all signals above that strength will actuate the pen.

Standardizing all sensitometers

The sensitometers here disclosed are used on a large number of detector cars operating independently on different railroads. When a report indicates a certain sensitivity has brought a stated result, it is desirable to be sure that the sensitivity corresponds to a standard. Variable resistance 106 in the coupling circuit for direct connection to the amplifier is in series with the output resistance 107 and can change the amplitude of the output signal without changing the metered current. Hence, by suitable adjustment, the desired result can be obtained. In practice, the resistance 106 is adjusted to the standard and locked up in an appropriate cabinet to make it inaccessible except to those authorized to test the standard or vary it.

Eliminating the effect of battery age

The purpose of the condenser 88 is to minimize a change of signal strength that would occur with a change of the battery 84 due to aging, even though the reading of the meter 191 should be the same with the battery aged as it was with the battery freshly charged.

Assume, for example, the resistance 87 is set to zero. Practically the entire battery voltage will then be impressed across the resistance 101. Any additional loading on resistance 101, such as the resistances 96 and 92, contact 91, etc., all of which together place additional conductance or load in parallel with resistance 101, would not affect the voltage across the resistance 101 very much, because the battery voltage is impressed directly on resistance 101. But suppose that, because the battery 84 is strong, a high resistance 87 is inserted. Then the voltage across resistance 101 will be reduced by the voltage inserted by 87. Any additional loading on resistance 101, or parallel conductance such as resistances 96 and 92, will cause a large fluctuation in voltage across resistance 101. Fluctuation of voltage across resistance 101 generates a signal in the sensitometer, and thus a higher voltage battery might well result in a stronger signal for a given meter reading than a lower voltage battery would. Condenser 88 is of high capacity and, being directly across the resistance 87, will resist any sudden change of voltage across the resistance 87. Thus, as far as quick surges are concerned, there is low impedance between the battery and the resistance 101 because of the condenser 88, which has infinite resistance to direct current. Therefore, the conductance through the resistance 87 becomes the only path by which direct current can flow, and its controllable value determines the amount of the current.

Fluctuations pass through the condenser. Current does not, but passes through the resistance. Therefore, fluctuations which generate the signal are the same with a weak and strong battery.

Checking the milliammeter 190

When the switch combination 73, 74 is closed, the cycles are repeated 180 times a minute. Each time the contact 91 closes the auxiliary circuit, more current flows through the milliammeter. Hence, the needle is swinging. In order to permit a steady reading, an auxiliary switch 83 is provided for closing the main circuit when the switch arm 73 is in open position.

Summary

In this preferred form of sensitometer, shown in Figs. 5, 6, 7, 8, and 9, there is a timing device emphasized in Fig. 6 for opening and closing the auxiliary signal circuit or causing the change in voltage level in the signal generating circuit. The main or primary signal generating circuit emphasized in Fig. 7 is always energized while the sensitometer is in operation, and the auxiliary signal generating circuit, shown with it in Fig. 8, is opened and closed, or its resistance is raised and lowered, to make the change in voltage levels by which the wave or similar signal is generated. As shown in Fig. 8, this wave may be put through the induction coils 46 and the pickup to test the entire apparatus, which test is ordinarily required only when a new pickup has been installed or something of that kind.

It can be applied to the amplifier only when the connections are as shown in Fig. 9 to test the amplifier and to enable its sensitivity to be adjusted to the particular threshold desired.

This application is a continuation-in-part of an application by Henry W. Keevil and John C. Dionne, Ser. No. 517,964, filed January 12, 1944, now abandoned.

I claim:

1. A sentiometer for use with a flaw-detecting apparatus including a thermionic amplifier, a detector coil connected to the input of the amplifier and an indicator controlled by the amplifier, the function of the sensitometer being to determine the general location as well as existence of any defectiveness in the apparatus, said sensitometer having a test coil for operative connection with said amplifier to transmit a test impulse of current thereto independently of said detector coil, means to form a test circuit for inducing an impulse of current in said detector coil, said test circuit including resistance and inductance, means to form a second test circuit for inducing an impulse of current in said test coil, said second circuit including substantially less inductance than said first circuit but having approximately equal total impedance.

2. A sensitometer for use with a flaw-detecting apparatus including a thermionic amplifier, a detector coil connected to the input of said amplifier and an indicator controlled by the amplifier, the function of the sensitometer being to determine the general location as well as existence of any defectiveness in the apparatus, said sensitometer having a test coil for operative connection with said amplifier to transmit current thereto, a first test circuit, a second test circuit, a source of E. M. F. to energize said two circuits, switch means to connect said source with said circuits selectively and to open and close the circuits to cause current changes therein from zero to maximum values and vice versa, inductance in said first circuit to induce an impulse of current in said detector coil in response to such current change, inductance in said second circuit to induce an impulse of current in said test coil in response to such current change, and capacitance combined with resistance in each of said circuits cooperative with the inductance therein to cause the rate and duration of said current changes to give said induced impulses the character of flaw-derived impulses.

3. A sensitometer for use with a flaw-detecting apparatus including a thermionic amplifier, a detector coil connected to the input of said amplifier and an indicator controlled by the amplifier, the function of the sensitometer being to determine the general location as well as existence of any defectiveness in the apparatus, said sensitometer having a source of E. M. F., a first means including a first circuit energized by said source to produce an impulse of current in said detector coil, a second means including a second circuit energized by said source to produce an impulse of current in said amplifier apart from the detector coil, meter means connected with both of said circuits for indicating current flow therethrough, and an adjustable resistance in one of said circuits to permit equalization of current flow through the two circuits thereby normally to cause identical indications by said meter means.

4. A sensitometer for use with a flaw-detecting apparatus including an amplifier, a detector coil connected to the input of said amplifier and an indicator controlled by the amplifier, said sensitometer having a first coil means for induction coupling with said detector, a second coil means, means for connecting said second coil means directly to said amplifier while said first coil means is coupled to said detector coil, a first circuit for energizing said first coil means in a manner normally to cause a response of given character by said indicator, a second circuit for energizing said second coil means in a manner normally to cause substantially the same response by said indicator, and means for closing and opening said two circuits in succession to produce said responses in succession for comparison to reveal whether or not said apparatus is in order.

5. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force, a variable resistance and a second resistance connected in series to said source, and a capacitor across each of said resistances, an auxiliary circuit, including low and high resistances in series across that second resistance, a capacity across the low resistance, and timing means for discharging said last mentioned capacity through said low resistance, whereby an impulse simulating a flaw impulse may be delivered to said amplifier.

6. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force, a variable resistance and a second resistance connected in series to said source, and a capacitor across each of said resistances, an auxiliary circuit, including low and high resistances in series across that second resistance, a capacity across the low resistance, timing means for discharging said last mentioned capacity through said low resistance, a coupling circuit for the main circuit including a resistance and a capacity in series across the second resistance, and leads from the opposite ends of the last mentioned resistance, whereby an impulse simulating a flaw impulse may be delivered to said amplifier.

7. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force and a resistance connected across said source, an auxiliary circuit including low and high resistances in series across said first mentioned resistance, a capacity across said lower resistance, and timing means for discharging said last mentioned capacity through said low resistance, whereby an impulse simulating a flaw impulse may be delivered to said amplifier.

8. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force and a resistance connected across said source, an auxiliary circuit including low and high resistances in series across said first mentioned resistance, a capacity across said lower resistance, timing means for discharging said last mentioned capacity through said low resistance, a coupling circuit for the main circuit including a resistance and a capacity in series across the second resistance, and leads from the opposite ends of the last mentioned resistance, whereby an impulse simulating a flaw impulse may be delivered to said amplifier.

9. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force and a resistance connected across said source, an auxiliary circuit including low and high resistances in series across said first mentioned resistance, a capacity across said lower resistance, timing means for discharging said last mentioned capacity through said low resistance, and a coupling circuit including a very high resistance and a low capacity in series across said high resistance, whereby an impulse simulating a flaw impulse may be delivered to said amplifier.

10. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force and a resistance connected across said source, an auxiliary circuit including low and high resistances in series across said first mentioned resistance, a capacity across said lower resistance, timing means for discharging said last mentioned capacity through said low resistance, including a source of electric pressure, a relay comprising a solenoid and its armature, and a large capacity across the solenoid, whereby an impulse simulating a flaw impulse may be delivered to said amplifier.

11. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force, a variable resistance and a second resistance connected in series to said source, and a capacitor across each of said resistances, an auxiliary circuit across said second resistance, and timing means for sharply varying the resistance with the auxiliary circuit, whereby an impulse simulating a flaw impulse may be delivered to said amplifier.

12. A sensitometer for rail flaw detection apparatus of the type in which an inductively acting detector coil traverses a magnetized rail and delivers an electrical impulse through an amplifier to an indicating apparatus when the coil encounters characteristic magnetic fields in the vicinity of rail flaws, said sensitometer being operatively connected to said amplifier to feed impulses thereto simulating flaw impulses, and said sensitometer comprising a main circuit including a source of electromotive force, a variable resistance and a second resistance connected in series to said source, and a capacitor across each of said resistances, an auxiliary circuit including low and high resistances in series across that second resistance, a capacity across the low resistance, timing means for discharging said last mentioned capacity through said low resistance, and means for coupling one of said circuits with said amplifier, whereby an impulse simulating a flaw impulse may be delivered to said amplifier.

JOHN C. DIONNE.

REFERENCES CITED

The following references are of record in the file of this patent:

UNITED STATES PATENTS

| Number | Name | Date |
| --- | --- | --- |
| 1,851,818 | Drake et al. | Mar. 29, 1932 |
| 2,074,742 | Drake | Mar. 23, 1937 |
| 2,113,783 | De Lanty | Apr. 12, 1938 |
| 2,170,515 | Dionne et al. | Aug. 22, 1939 |
| 2,266,358 | De Lanty | Dec. 16, 1941 |
| 2,452,213 | Sontheimer | Oct. 29, 1948 |